(12) United States Patent
Jackson et al.

(10) Patent No.: US 6,633,625 B2
(45) Date of Patent: Oct. 14, 2003

(54) DENSITY PROFILER FOR MEASURING DENSITY PROFILE OF A MEDIUM AND METHOD AND APPARATUS USING SAME

(75) Inventors: Peter Jackson, Stockton on Tees (GB); Robert Simon Knapp, Hale (GB)

(73) Assignee: Johnson Matthey PLC, London (GB)

(*) Notice: Subject to any disclaimer, the term of this patent is extended or adjusted under 35 U.S.C. 154(b) by 29 days.

(21) Appl. No.: 09/833,659

(22) Filed: Apr. 13, 2001

(65) Prior Publication Data

US 2001/0047680 A1 Dec. 6, 2001

Related U.S. Application Data

(63) Continuation of application No. PCT/GB99/03365, filed on Oct. 12, 1999.

(30) Foreign Application Priority Data

Oct. 14, 1998 (GB) .............................................. 9822301

(51) Int. Cl.⁷ .............................................. G01B 15/02
(52) U.S. Cl. ........................ 378/54; 378/52; 250/357.1
(58) Field of Search .............................. 378/51, 52, 53, 378/54, 55, 56; 250/357.1, 363.01; 73/19.1, 19.01, 19.03, 61.44, 61.43, 61.48, 61.49, 61.79, 32 R

(56) References Cited

U.S. PATENT DOCUMENTS

| | | | |
|---|---|---|---|
| 3,100,841 A | * | 8/1963 | Reider .......................... 250/383 |
| 3,652,857 A | | 3/1972 | Frevert .................... 250/363.01 |
| 3,654,458 A | * | 4/1972 | Burrus et al. .................. 378/52 |
| 3,784,827 A | * | 1/1974 | Calhoun .................... 250/498.1 |
| 4,369,368 A | * | 1/1983 | Bernard et al. ........... 250/357.1 |
| 4,428,839 A | * | 1/1984 | Davies et al. .................. 95/253 |
| 4,471,223 A | | 9/1984 | Hurst et al. ............... 250/357.1 |
| 4,661,700 A | | 4/1987 | Holenka ...................... 250/267 |

FOREIGN PATENT DOCUMENTS

WO  WO 98/41304  9/1998

OTHER PUBLICATIONS

Bierwolf, et al.; Industrielle Messverfahren mit radioaktiven Isotopen;Technische Miteillungen AEG—Telefunken, vol. 58, No. 6 (1968) pp. 340–349.

* cited by examiner

Primary Examiner—Robert H. Kim
Assistant Examiner—Therese Barber
(74) Attorney, Agent, or Firm—Pillsbury Winthrop LLP

(57) ABSTRACT

A density profiler for measuring a density profile of a medium including at least two liquids and gaseous phases includes an axially distributed source array providing at least 10 collimated ionising radiation beams; an axially distributed radiation detector array, each detector associated in use with one of the beams and producing an output signal in response to incident radiation; and an analysor for the detector output signals to determine the density of the medium traversed by the beams of radiation.

32 Claims, 2 Drawing Sheets

US 6,633,625 B2

DENSITY PROFILER FOR MEASURING DENSITY PROFILE OF A MEDIUM AND METHOD AND APPARATUS USING SAME

CROSS REFERENCE TO RELATED APPLICATIONS

This is a continuation of International Application No. PCT/GB99/03365 filed Oct. 12, 1999 which designates the U.S., and that International Application was published under PCT Article 21(2) in English.

FIELD OF THE INVENTION

This invention relates to measurement systems for determining the boundaries between phases, in particular to such systems in which the boundaries between at least three phases have to be located and especially to the location of gas-oil and oil-water boundaries in separation vessels in oil production installations.

BACKGROUND OF THE INVENTION

In oil production it is often necessary to separate aqueous, oil and gas phases that form the flow from a production well. Water and gas are often naturally co-produced with oil and, as oil fields approach the end of their useful life, water is often injected into the oil bearing strata to maintain the production of oil and this results in the stream from the production wells including an increasing proportion of water. Minerals e.g. sand and heavy oil or tar materials e.g. asphaltine, may also be present in the flow from the well. This gives a product stream which needs to be separated before further processing.

Typically such separation is carried out in a separation system which may include pre-separation means such as a cyclone to separate much of any gaseous phase present from the liquid phases and which usually includes a separation vessel in which the fluid flow is slowed and rendered less turbulent e.g. using baffles, and then allowed to separate into layers which are then separately taken from the separation vessel. The means for removing the respective phases are usually fixed within the separation vessel which typically operates at superambient pressure typically up to several times ambient pressure e.g. from 2 to 10 bar absolute (0.2 to 1 MPa) The fixed positioning of the means for removing the respective phases means that control of the separator to maintain satisfactory operation is by way of controlling the various flow rates (inflow and outflow) so that the levels of the various phases in the separator are maintained suitably to enable their ready removal from the separator. The separation of the phases may be made difficult in practice by foam formed by liquid and gas phases and dispersions or emulsions of oil and aqueous phases. The presence of foam or emulsions makes the inter-phase boundaries less definite and thus makes overall control more difficult. The operation of such separators is complicated because it is difficult to determine the location of the phase boundaries from outside the separator. The nature of the materials and the pressure under which separators operate make it impractical to use direct visual means e.g. sick; glasses, and instrumental optical systems are not satisfactory.

BRIEF SUMMARY OF THE INVENTION

The present invention adopts measurements of the adsorption or dispersion of ionising radiation as a means of measuring the density of the medium at a number, usually many, levels in a multi-phase mixture, as in an oil separator, thereby enabling a density profile to be established, from which the position of the phase boundaries and, if desired, the thickness of any interphase regions e.g. of foam or dispersions or emulsions, can be determined.

Accordingly the present invention provides a density profiler for measuring a density profile of a medium including at least two liquid phases and a gaseous phase which profiler comprises:

1. an axially distributed array of sources capable of providing at least 1 collimated beams of ionising radiation;
2. an axially distributed array of radiation detectors, each detector being associated in use with a respective one of the said beams of ionising radiation and producing an output signal in response to the incidence of the ionising radiation;
3. means for analysing the detector output signals to determine the density of the medium traversed by the beams of radiation in passing from the source array to the detector array.

The invention specifically includes:

an oil separator which incorporates a density profiler of the invention in which in use an input oil containing stream includes oil, water (aqueous phase) and gas an the density profiler is positioned to measure the density of oil, aqueous and gas phases;

a method of measuring the density profile of a medium including oil, aqueous and gas phases in which a density profiler of the invention is positioned in a region of the medium in which the different phases are at least partially separated;

a method of controlling an oil separator including a density profiler of he invention, in which the position of the phase boundaries is determined from a density profile measured according to the invention and the inlet flow rate to and/or one or more outlet flow rates from the separator are controlled to maintain the position of the phase boundaries within predetermined limits;

a method of controlling an oil separator including a density profiler of the invention, in which the thickness of the interphase regions is determined from a density profile measured according to the invention and the concentration of chemicals added to the separator to reduce the formation of interphases is controlled to maintain the thickness of the interphase regions within predetermined limits.

The invention further includes a combined radiation source holder and collimator, suitable for use in the density profiler of the invention, in which a source holder is a rod having plurality of, particularly radial, holes adapted to receive radiation sources and, arranged telescopically, desirably substantially coaxially, with the rod, a tube, made of radiation adsorbent material, which has transmission holes in it, the rod and tube being moveable, particularly axially moveable, relative to one another so that in a first position each source is in registry with at least one transmission hole aligned to provide a oath along which radiation from the source traverses the thickness of the tube to produce a collimated beam of radiation which is projected laterally relative to the rod and tube, and that in a second position each source is masked by a portion of the tube so that no collimated beam of radiation is generated.

DETAILED DESCRIPTION OF THE INVENTION

Figure 1:
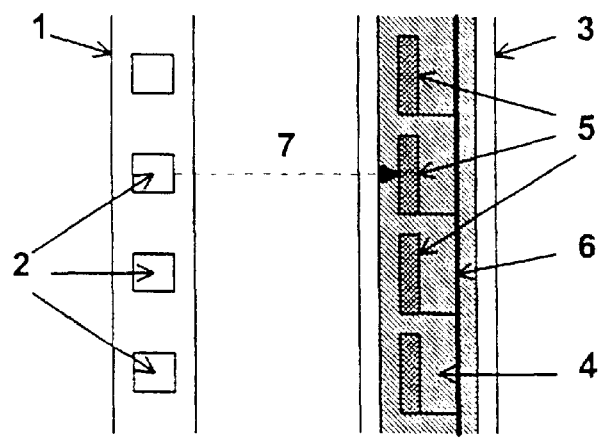
FIG. 1 is a diagrammatic vertical cross section of part of arrays of source and detectors of a density profiler of the invention.

The density profiler of the invention is intended for use in equipment such a oil separators and normally, the source and detector arrays will be arranged vertically or near vertically with the collimated beams of radiation between source and detector arrays arrange horizontally or near horizontally (but see below concerning multiple beans from single sources). This arrangement generally optimises vertical resolution and compactness of the installation. In oil separators there is a flow of the multi-phase medium past or between the source array—detector array combination(s). The profile measurements thus reflect the situation during a continuous process and can thus be used as part of a control feedback loop (see below).

The limit on the vertical resolution of the density profiler of the invention is determined primarily by the vertical separation of the sources and detectors. This is clearly dependent on the sizes of the sources and detectors and the precision of collimation of the radiation beams. Generally, the size of the detectors, and thus the ability to space them apart (vertically) represents the main limit on the vertical resolution. Particularly in density profiling in oil separators, the main end use envisaged, it is desirable to achieve a vertical resolution of at least as good as 100 mm and more usually at least as good as 50 mm. We have successfully made profilers in which the vertical detector separation of between 25 and 30 mm giving a vertical resolution at least this good. Of course, increasing the detector separation will reduce the vertical resolution correspondingly. By reducing the spacing between detectors, the vertical detector separation can be reduced to 20 mm and by using the techniques mentioned below, the effective detector separation could be reduced to about 5 mm. It is possible to process the data from the density profiler to improve the resolution e.g. using computer based data processing techniques, but we have not found any specific need to improve the basic resolution of the density profiler in this way.

Thus, the number of sources and detectors used depends directly on the vertical spacing of the detectors and the depth over which it is desired to measure the density profile.

The invention is particularly applicable to density profile measurement in oil separators where, typically, there are at least three phases present: oil, gas and an aqueous phase (sometimes brine) and often in effect a fourth phase of sand or relatively high molecular weight and density bituminous hydrocarbons commonly called asphaltines which can form a sludge at the bottom of the separator. The accumulation of excess sand and sludge is usually detected by a mechanical level sensor, but the density profiler of the invention could also do this. In normal use, the density profiler will be arranged to be immersed in or traverse all three of the main fluid phases. In addition to the separate fluid phases, it is often the case that at the aqueous/oil interphase boundary, emulsions—either water in oil or oil in water—are frequently formed (or incompletely separate), and at the gas/oil interphase boundary, foams may be formed. Using the density profiler of the invention, it is practical both to locate the interphase boundary regions and to estimate the thickness of any interphase emulsion or foam.

Clearly the ability to determine the extent of any interphase emulsion or foam depends on the vertical resolution of the density profiler. The practical values of resolution as discussed above are adequate for realistic assessment of both the location of a phase boundary and the assessment of the thickness of interphase emulsion or foam. With practical detectors (see below) the density measurement when a phase boundary lies alongside a detector may be an intermediate value for the values from each phase separately. Although this may have a theoretical effect on ultimate precision, we have not found that it gives rise to a real difficulty in practice.

The main mechanism by which the collimated beam of ionising radiation is attenuated is Compton scattering, the extent of which is directly related to the density of the medium through which the beam passes and inversely related to beam energy. The beam length, the linear spacing between each detector and the corresponding collimated source through the medium whose density is being measured or profiled, will generally be chosen depending on the energy and intensity of the collimated beam and the density of the medium. In practice, the minimum and maximum path lengths will also be determined by the operating environment. In (in-line) oil separators the minimum beam length will generally be about 2.5 cm to minimise the risk of blockage of the source/detector gap and the maximum beam length is not likely to be more than about 1.5 m or the profiler will be too large for practical use in in-line separators. Within these limits the maximum beam length is limited by the need to have a detected signal above the noise floor of the system (dependent on source energy and intensity) and the minimum beam length by obtaining sufficient absorption to resolve density differences adequately (dependent primarily on beam energy). Thus for a given source intensity, a high energy beam needs a longer minimum beam length than a less energetic beam. As is explained below, generally in this invention the beam length is from 3 to 15, more usually from 5 to 10, cm although longer beam lengths can be used. Compact equipment has a particular advantage in fitting to pressurised equipment in that it requires less extensive access through the wall of the pressure vessel. Also, the use of lower energy (less penetrating) radiation reduces the risk of radiation exposure.

The energy of the source radiation is typically not more than about 750 keV and is desirably lower than this. The source can be a radioactive isotope as is used in conventional (single source/ detector) density gauges where the radiation source is commonly the 661 keV gamma radiation from $^{137}$Cs. For practical gauges, the beam length is typically 40 to 100 cm and this is inconveniently long for use in a density profiler to be retrofitted to a pressure vessel through a single port—typical ports in oil separator pressure vessels are from 10 to 30 cm (4 to 12 inches) commonly about 15 cm (6 inches) in diameter. The use of a lower energy source is thus desirable and energies of less than 500 keV, particularly less than 300 keV and optimally less than 100 keV, are desirable in this invention. The minimum energy of the radiation is about 20 keV, less energetic radiation will generally have too short an effective path length to be useful, and more desirably the source energy is at least about 40 keV. Thus, lower energy sources than $^{137}$Cs gamma sources are desirable. Potential sources include $^{133}$Ba which is a 356 and 80 keV gamma source and, particularly desirably, $^{241}$Am which is a 60 keV gamma source. The use of $^{241}$Am as the source for the ionising radiation used in this invention forms a specific aspect of the invention. Of course, for a permanent installation, a radioisotope source will be chosen to have a relatively long half life both to give the equipment a satisfactory service life and to reduce the need to recalibrate to take account of reduction in source intensity from source ageing. Usually, the half life of the radioisotope used will be at least 2, and desirably at least 10, years, and not usually more than about 10000. more desirably not more than about 1000, years. The half lives of the radioisotopes mentioned above are: $^{137}$Cs gamma ca. 30 years, $^{133}$Ba ca. 10 years and $^{241}$Am ca. 430 years. These values, especially for the Americium, are satisfactory for use in density profilers of the invention. The use of an $^{241}$Am source enables the use of a path length of from 5 to 10 cm so that a profiler can be installed through a single 15 cm port. Other radioisotope sources can be used if desired, especially those having properties as described above, but other such sources are not generally readily available from commercial sources. By using low energy sources equipment handling and source shielding are also made safer and/or easier. The source radiation could also be X-rays and, although robust compact sources are not easy to engineer, for such sources, intrinsic source half life is not a problem.

Desirably the source intensity will be at least about $4 \times 10^7$, more usually from $4 \times 10^8$ to $4 \times 10^9$, Becquerel (Bq). The use of sources with lower intensity may require unduly long integration times to obtain adequately precise results (signal to noise ratio) and more intense sources are relatively expensive and/or may lead to swamping of the detectors. $^{241}$Am sources having an intensity of about $1.7 \times 10^9$ Bq are readily commercially available and are suitable for use in this invention. There are practical engineering limits to the precision of collimation (nearness to a non-spreading beam). Simplicity of design will usually lead to accepting a degree of spread in the beam that may result in detectors picking up radiation from more than one source (crosstalk). In this invention, we have found that crosstalk can be reduced by using multiple columns of detectors with detectors in each column being correspondingly more widely spaced and the beams aligned with one column of detectors being radially angularly displaced from those for other detector column(s). In theory multiple columns of sources could also be used, but this adds substantially to the precision of manufacture and set up required to maintain resolution. We have achieved significant gains by using two columns of detectors. The use of more than three columns of detectors is not desirable because of the increased risk of physical obstruction of the beam paths and added construction complexity and (radial/horizontal) size. A further benefit from using multiple detector columns is that where electrically powered detectors are used, the reduction in the number of detectors in each column reduces the power supplied to each column making it easier to comply with safety requirements in when dealing with highly combustible oil/gas systems. We have successfully built profilers that meet the "intrinsic safety" requirement in oilfield operation. (See also below in the discussion of detectors.)

The invention accordingly includes a density profiler of the invention in which the detector array includes at least two columns of detectors, the columns of detectors being radially angularly displaced from each other. Desirably, the beam lengths of the radiation between the sources and the corresponding detectors in the different columns are substantially equal. This can readily be achieved by locating the columns of detectors radially substantially equidistant from the source array.

The simplest arrangement of sources and detectors is 1:1 pairwise matching with horizontal collimated beams. However, the radiation sources are a significant part of the system cost and this can be reduced by collimating multiple beams from single sources. Two beams can be collimated from single sources relatively easily with only a minor reduction in the resolution of the system and although it is theoretically possible to collimate more beams from a single source, the savings available are limited and the added complexity and loss of resolution are likely to be significant. One way of producing pairs of collimated beams from single sources is described in more detail below in connection with the source holder.

The particular detectors used in a density profiler are not in themselves critical although in practice compact devices will usually be chosen. The detectors as in use immersed in the test medium, can be electrically powered e.g. Geiger-Muller (GM) tubes or scintillation detectors linked with photomultipliers, or unpowered as in simple scintillation devices. Among electrically powered detectors, GM tubes are particularly convenient, because they are electrically and thermally robust and are available in mechanically robust forms. Among unpowered detectors scintillation detectors linked to counters by fibre optic links (optionally with photomultipliers outside the container for the medium under test) are particularly useful. When electrically powered detectors are used and especially when the density profiler is used in a combustion or explosion risk environment, it is desirable that the total electrical energy and power associated with the detectors is sufficiently low as not to be a significant source of ignition in the event of system failure (particularly resulting in direct contact between combustible or explosive materials and any electrically live components). Photomultipliers generally require relatively large amounts of electrical power (as compared with GM tubes) and it is thus preferable to avoid including these (effectively) as part of the detectors. GM tubes are readily available with physical dimensions of cylinders about 12.5 mm long and about 5 mm in diameter. The resolution figures given above are based on such tubes arranged with their axis vertical and aligned coaxially (one above the other). The resolution could be improved by using smaller devices (GM tubes as short as about 5 mm are available) or by spacing the GM tubes more closely e.g. with their axes arranged horizontally, or by offsetting their axes and overlapping the cylinders in a vertical direction, although closer spacing may increase the extent of crosstalk. Using commercially available 12.5 mm GM tubes it is practical to fabricate arrays containing up to about 32 detectors, or even up to about 48, whilst restricting the total power in the detector array so that it satisfies the "intrinsically safe" rating for use in combustible or explosive environments as found in oil/gas extraction. Of course, using unpowered scintillation detectors with fibre optic links is even safer as there are no electrical components necessary in the detector array.

The counting devices for any of these detectors will usually be electronic and each detector will be associated with a counter which will usually be linked to a device that translates the detection (count) rate to a measure corresponding to density for each detector. Using modern electronics it will usually be practical to provide a counter for each detector, but time division multiplexing of counters can be used although with a resultant increase in the time needed for measurement of a density profile.

For use in fluid environments especially the relatively aggressive environment of oil separators, the source and detector arrays of a density profiler will usually be placed in dip tubes that provide a mechanical (pressure), chemical and, particularly for electrically powered detectors, an electrically insulating barrier between the components of the profiler and the material being profiled. The material of the dip tubes will be chosen to have sufficient strength and chemical resistance and to be suitably transparent to the ionising radiation. Using high energy sources, transparency is not likely to be a problem (and consequently proper safety shielding may be a problem) and materials such as stainless steel can readily be used. Using low energy sources e.g. $^{241}$Am, the dip tubes will usually be made of more radiation transparent materials such as titanium, at a thickness of from 1 to 3, particularly about 2, mm or high performance synthetic composites e.g. fibre (glass or carbon) reinforced PEEK (aromatic poly-ether-ether-ketone) where the wall thickness may be higher e.g. from about 3 to about 10 mm. Where electrically powered detectors are used and the material of the dip tube is metallic a separate electrically insulating barrier will generally also be provided.

The radiation sources will normally be retained in a holder which can be removed from the dip tube, to simplify installation and maintenance. The invention includes a combined source holder and beam collimator which can also act as a source shield. In this aspect of the invention the source holder is typically a solid rod, e.g. of stainless steel, typically having a diameter of from 10 to 20 mm, having a plurality of longitudinally spaced radial holes adapted to receive radiation sources. The collimator is a tube, typically arranged in use to fit coaxially over the source holder, made of radiation absorbent material, which has transmission holes in it which in use are arranged so that each source has aligned with it one or more holes which act to transmit, collimate and direct the radiation towards the detectors. The rod and tube can be made relatively moveable so that in a first position at least one collimated beam is generated from each source and a second position each source is masked by a portion of the tube so that the bulk of the radiation from the source is absorbed or scattered and no collimated beam of radiation is generated. The relative movement can be axial or rotational, although the latter may be complicated if more than one column of detectors is used. Where a single beam is produced from each source, the hole in the wall of the tube will generally be horizontal. When more than one beam is generated from a single source, the (or at least some) holes may extend at angle(s) above and/or below horizontal. Where plural columns of detectors are used the alignment of sources and collimator holes will be at suitable radial (and if necessary vertical) angles to project beams toward the detectors.

In FIG. 1 of the accompanying drawings a source dip tube (1) has within it a distributed array of collimated sources (2) of ionising radiation (the sources will usually be mounted in or on a source holder but this is omitted for clarity). Spaced from the source dip tube is a detector dip tube (3) having within it a support board (4) for an axially distributed array of detectors (5) with connections (6) to an analysis unit for receiving and processing the output signals from the detectors (5) (not shown). Typically the detectors can be GM tubes and the support (4) will be or include a circuit board for the electrical components and connections including connections (6). Alternatively the detectors can be scintillation devices and the connections (6) can be fibre optical connections to the analysis unit (which may include optical amplification means or optical/electronic amplification means such as photomultipliers and means for conversion from light to electrical signals such as photodiodes). In use, a collimated beam (7) of radiation is emitted by the source and passes through the medium between source dip tube and detector dip tube in the process being attenuated, mainly by Compton scattering, towards the corresponding detector. The signal at the detector corresponds to the extent of beam attenuation and thus to the density of the medium.

Figure 2:
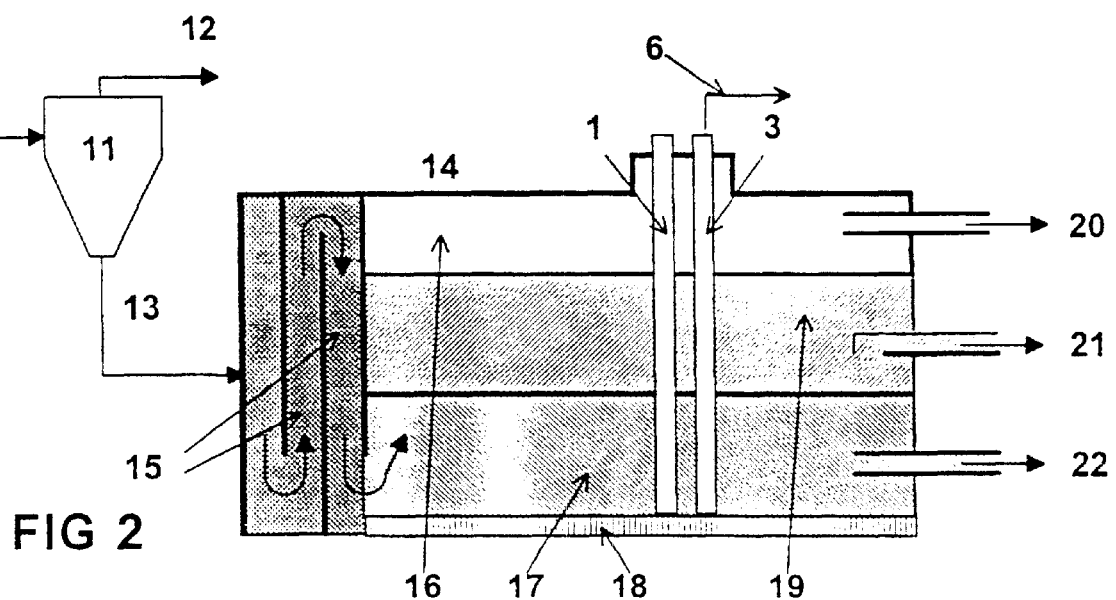
FIG. 2 is a diagrammatic vertical cross section of an oil separator tank having a density profiler of the invention installed.

In FIG. 2 density profiler dip tubes (1) and (3) (sources and detectors not shown for clarity) pass through the wall of pressure vessel (14) of an oil separator and are immersed in the multi phase medium within the vessel, typically arranged substantially vertically. The input flow (10) is a mixture of oil, gas and aqueous phase ("water") which is passed to cyclone 11 to effect preliminary separation of gas which is vented through outlet line (12) usually for further processing and fluid which flows to the main separator through line (13). The fluid flow is slowed and rendered less turbulent by baffles (15) before separating into layers of gas (16), water (17), sand/sludge (18) and oil (19). The separated layers flow out through ports for gas (20), oil (21) and water (22) respectively. In practice, the cyclone may be incorporated into the structure of the separator pressure vessel (14) and gas outlet flow (12) may be made common with gas outlet flow (20). A further port (not shown) may be provided in the base of the vessel to remove sand/sludge. In operation of the density profiler the signal (e.g. in the form of a count) obtained from each detector depends on the density of the medium lying in the beam length to that detector so that the detector signals collected and processed by the analysis unit provide a representation of the density and thus the composition profile of the fluid through its depth at least from above the gas/oil interface to below the oil/water interface.

Figure 3:
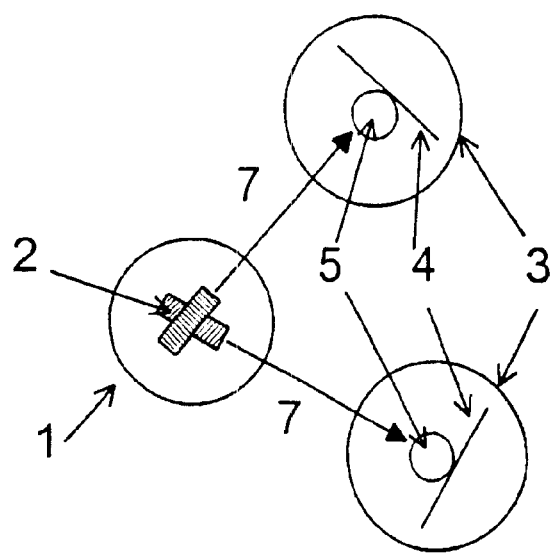
FIG. 3 is diagrammatic horizontal cross sectional view of sources and detectors of a density profiler of the invention.

In FIG. 3. a pair of detector dip tubes (3) each has a support board (4) and detectors (5). In the source dip tube (1) collimated sources (2) are arranged in an axial (vertical) array and are alternately directed to target detectors in each of the columns of detectors.

Figure 4:
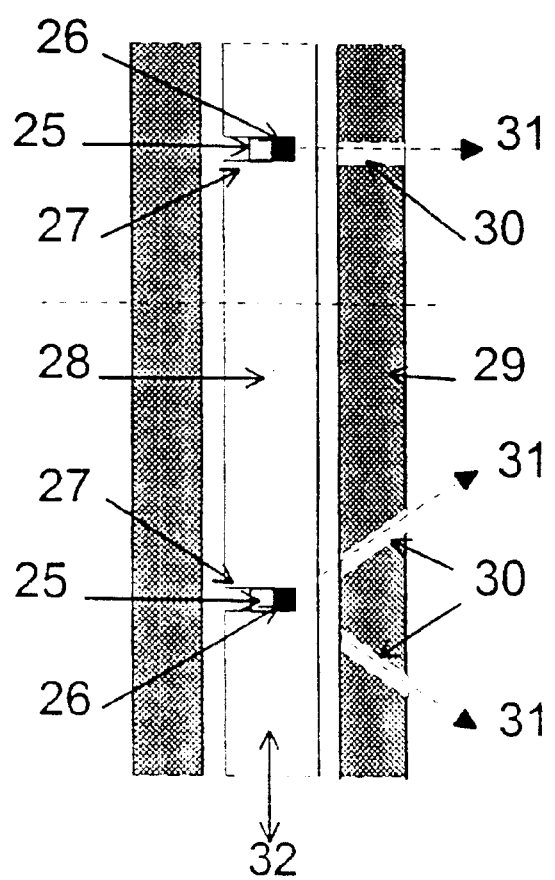
FIG. 4 is a diagrammatic vertical cross section of part of a source holder and collimator.

One form of the source holder and collimator of the invention is illustrated in FIG. 4 where source containers (25) include sources (26) held in holes (27) in holder rod (28). The source containers are made of radiation absorbent material so that radiation is emitted substantially from the source (radiation open) end of the container, Surrounding the source holder rod is screen/collimator tube (29) which includes holes (30). As shown, the holes (30) are positioned opposite the sources and act to produce collimated beams of radiation (31). Relative movement, particularly axial movement, of source holder rod and screen/collimator tube will position 'blank' regions of tube wall opposite the active end of the sources thus substantially preventing the radiation passing through the tube wall. The upper part of FIG. 4 shows a single collimated beam being generated from a source and the lower part of the Figure illustrates one way of generating two collimated beams from a single source.

In an oil separator, for example as illustrated diagrammatically in FIG. 3, the gas phase as it separates from the oil phase may entrain drops or droplets, e.g. aerosol droplets, and/or may form a foam interphase with the oil. The presence of excessive amounts of foam and/or of a persistent foam may reduce the effectiveness of separation by oil flowing out of the separator with the gas or gas with the oil. Drop(let)s may be encouraged to precipitate from the gas phase by the inclusion of baffles, nets, filters or similar devices in the separator. These will usually be positioned in the gas phase, often including adjacent the gas outlet, and frequently extending under the surface of the oil phase to enhance drop(let) precipitation. The precipitation of oil drop(let)s from the gas phase may also be enhanced by the inclusion of anti-foam chemical agents in the medium. This may be used in combination with mechanical devices such as those as described above.

Similarly, emulsions and/or dispersions, water in oil or oil in water, may be formed as an interphase between the oil and aqueous phases, possibly resulting in entrainment of oil in the water or water in the oil. The addition of chemical demulsifier agents to the medium can be used to reduce the extent of such emulsions and dispersions and thus enhance oil/water separation.

The presence of substantial interphases is undesirable as it reduces the thickness of the phases where separation is substantially complete and thus makes the control of the separator more critical if phase mixing in the outlet(s) is to be avoided. The density profiler of this invention enables accurate estimation of the position of the chase boundaries to be made and also an estimation of the thickness of any interphase regions. These data can be used to control the separator by:

1 adjusting the inlet flow rate and/or one or more outlet flow rates so as to control the position of the phase boundaries within predetermined limits; and/or 2 adjusting the rate of addition of anti-foam agents and/or demulsifiers to control the thickness of a foam or emulsion or dispersion interphase layer(s) respectively within predetermined limits.

The density profiler of the invention can thus be included in a feedback control loop for the oil separator. The control loop can include manual setting of control valves of additive feed rates in response to measured density profiles or can (at least in principle) be included in automatic control systems.

What is claimed is:

1. A density profiler for measuring a density profile of a medium including at least two liquid phases and a gaseous phase which profiler includes:
   a) an axially distributed array of sources capable of providing at least 10 collimated beams of ionising radiation;
   b) an axially distributed array of radiation detectors, each detector being associated in use with a respective one of the said beams of ionising radiation and positioned such that the beam length between a source and a respective detector is from 3 to 15 cm, and each detector producing an output signal in response to the incidence of the ionising radiation; and
   c) means for analysing the detector output signals to determine the density of the medium traversed by the beams of radiation in passing from the source array to the detector array.

2. A density profiler as claimed in claim 1 wherein the axial separation between successive detectors is from 5 to 50 mm.

3. A density profiler as claimed in claim 1 wherein the axial separation between successive detectors is from 20 to 30 mm.

4. A density profiler as claimed in claim 1 wherein the number of detectors is from 20 to 100.

5. A density profiler as claimed in claim 1 wherein the sources are $^{241}$Am 60 keV gamma sources.

6. A density profiler as claimed in claim 1 wherein the sources have an intensity of from $4 \times 10^8$ to $4 \times 10^9$ Becquerel.

7. A density profiler as claimed in claim 1 in which the detector array includes at least two columns of detectors, the columns of detectors being radially angularly displaced from each other.

8. A density profiler as claimed in claim 7 in which the columns of detectors are located radially substantially equidistant from the source array.

9. A density profiler as claimed in claim 1 in which, in the array of sources, two beams are collimated from single sources.

10. A density profiler as claimed in claim 1 in which in the detectors are Geiger-Muller tubes or scintillation detectors linked with photomultipliers, or unpowered scintillation devices.

11. A density profiler as claimed in claim 1 in which the source and detector arrays of the density profiler are placed in dip tubes.

12. A density profiler as claimed in claim 11 in which the dip tubes are of titanium and have a wall thickness of from 1 to 3 mm.

13. Combined source and detector arrays for a density profiler for measuring a density profile of a medium including at least two liquid phases and a gaseous phase which arrays include:
   i) an axially distributed array of sources capable of providing at least 10 collimated beams of ionising radiation;
   ii) an axially distributed array of radiation detectors, each detector being associated in use with a respective one of the said beams of ionising radiation and positioned such that the beam length between a source and a respective detector is from 3 to 15 cm, and each detector producing an output signal in response to the incidence of the ionising radiation.

14. Combined arrays as claimed in claim 13 wherein the axial separation between successive detectors is from 20 to 30 mm.

15. Combined arrays as claimed in claim 13 wherein the number of detectors is from 20 to 100.

16. Combined arrays as claimed in claim 13 wherein the sources are $^{241}$Am 60 keV gamma sources.

17. Combined arrays as claimed in claim 13 wherein the sources have an intensity of from $4 \times 10^8$ to $4 \times 10^9$ Becquerel.

18. Combined arrays as claimed in claim 13 in which the detector array includes at least two columns of detectors, the columns of detectors being radially angularly displaced from each other substantially equidistant from the source array.

19. Combined arrays as claimed in claim 13 in which in the array of sources, two beams are collimated from single sources.

20. Combined arrays as claimed in claim 13 in which in the detectors are Geiger-Muller tubes or scintillation detectors linked with photomultipliers, or unpowered scintillation devices.

21. Combined arrays as claimed in claim 13 in which the source and detector arrays of the density profiler are placed in dip tubes of titanium and have a wall thickness of from 1 to 3 mm.

22. An oil separator for an input stream having oil, aqueous and gas phases incorporating a density profiler having:
   a) an axially distributed array of sources capable of providing at least 10 collimated beams of ionising radiation;
   b) an axially distributed array of radiation detectors, each detector being associated in use with a respective one of the said beams of ionising radiation and positioned such that the beam length between a source and a respective detector is from 3 to 15 cm, and each detector producing an output signal in response to the incidence of the ionising radiation; and
   c) means for analysing the detector output signals to determine the density of the medium traversed by the beams of radiation in passing from the source array to the detector arrays wherein the density profiler is positioned to measure the density of the oil, aqueous and gas phases.

23. A method of measuring the density profile of a medium including oil, aqueous and gas phases using a density profiler having:
  a) an axially distributed array of sources capable of providing at least 10 collimated beams of ionising radiation;
  b) an axially distributed array of radiation detectors, each detector being associated in use with a respective one of the said beams of ionising radiation and positioned such that the beam length between a source and a respective detector is from 3 to 15 cm, and each detector producing an output signal in response to the incidence of the ionising radiation; and
  c) means for analysing the detector output signals to determine the density of the medium traversed by the beams of radiation in passing from the source array to the detector arrays, in which the source array and detector array of the density profiler are positioned in a region of the medium in which the different phases are at least partially separated.

24. A method as claimed in claim 23 used to determine the position of the phase boundaries in an oil separator and the inlet flow rate to the separator and/or one or more outlet flow rates from the separator are controlled to maintain the position of the phase boundaries within predetermined limits.

25. A method as claimed in claim 23 used to determine the thickness of the interphase regions in an oil and the concentration of chemicals added to the separator to reduce the formation of interphases is controlled to maintain the thickness of the interphase regions within predetermined limits.

26. A method as claimed in claim 25 in which the chemicals added to the separator include at least one antifoam agent and/or demulsifier.

27. A combined radiation source holder and collimator comprising
  a) a source holder in the form of a rod having a plurality of holes adapted to receive radiation sources and
  b) a collimator tube, arranged telescopically with the rod and made of radiation absorbent material, said tube having transmission holes therein, said rod and tube being moveable relative to one another so that in a first position each source is in registry with at least one transmission hole aligned to provide a path along which radiation from the source traverses the co thickness of the tube to produce a collimated beam of radiation which is projected laterally relative to the rod and tube, and in a second position each source is masked by a portion of the tube so that no collimated beam of radiation is generated.

28. A combined source holder and collimator as claimed in claim 27 in which the holes adapted to receive radiation sources are radial holes in the source holder rod.

29. A combined source holder and collimator as claimed in claim 27 in which the tube of radiation absorbent material is arranged substantially coaxially with the source holder rod.

30. A combined source holder and collimator as claimed in claim 27 in which the source holder rod and the tube of radiation absorbent material are axially moveable relative to one another.

31. A combined source holder and collimator as claimed in claim 30 in which the source holder rod and tube of radiation absorbent material are axially moveable relative to one another between
  a first position in which at least one collimated beam is generated from each source and
  a second position in which each source is masked by a portion of the tube so that the bulk of the radiation from the source is absorbed or scattered and no collimated beam of radiation is generated.

32. In combination, a vessel for containing a medium including at least two liquid phases and a gaseous phase and a density profiler comprising:
  a) a first dip tube located within said vessel and containing an axially distributed array of sources capable of providing at least 10 collimated beams of ionizing radiation;
  b) at least one further dip tube located within the vessel and containing an axially distributed array of radiation detectors, each detector being associated in use with a respective one of the said beams of ionizing radiation and positioned such that the beam length between a source and a respective detector is from 3 to 15 cm, and each detector producing an output signal in response to the incidence of the ionizing radiation; and
  c) means for analyzing the detector output signals to determine the density of the medium traversed by the beams of radiation in passing from the source array to the detector array.

* * * * *